United States Patent [19]

Speer

[11] 4,181,547
[45] Jan. 1, 1980

[54] METHOD FOR REPAIRING PLASTIC-LIKE MATERIALS

[76] Inventor: Lawrence Speer, 4380 Inner Circle Dr., Brunswick, Ohio 44212

[21] Appl. No.: 862,921

[22] Filed: Dec. 21, 1977

Related U.S. Application Data

[63] Continuation of Ser. No. 684,889, Jan. 14, 1976, abandoned.

[51] Int. Cl.² ............ B32B 35/00; B29C 23/00
[52] U.S. Cl. ............ 156/98; 156/94; 156/289; 264/36; 427/140; 427/274; 427/277
[58] Field of Search .......... 156/94, 98, 289; 219/378; 264/36; 427/140, 256, 274, 277

[56] References Cited

U.S. PATENT DOCUMENTS

| | | | |
|---|---|---|---|
| 1,036,165 | 8/1912 | Tongue | 156/581 X |
| 3,713,926 | 1/1973 | Speer | 156/98 |
| 3,887,413 | 6/1975 | Speer | 156/94 |
| 3,975,558 | 8/1976 | Speer | 427/140 |
| 4,013,495 | 3/1977 | Golumbic | 156/98 |

*Primary Examiner*—John T. Goolkasian
*Assistant Examiner*—Robert A. Dawson
*Attorney, Agent, or Firm*—Wilson, Fraser, Barker & Clemens

[57] ABSTRACT

A plastic repair procedure employing a heat cured patching paste and the application of a controlled quantity of heat avoids the damage frequently caused by excessive application of heat during the requisite heating step. A special tool herein described employs a new heating principle for repairs of this type.

4 Claims, 2 Drawing Figures

METHOD FOR REPAIRING PLASTIC-LIKE MATERIALS

This is a continuation of application Ser. No. 684,889 filed Jan. 14, 1976, now abandoned.

FIELD OF THE INVENTION

This invention relates to the repair of damages in materials such as plastics and leather-like materials.

BACKGROUND OF THE INVENTION

Many techniques for repairing damages to plastic materials such as vinyl upholstery fabrics are known. Common to the most successful of these techniques is the use of heat during the repair procedure, the heating step being the most critical step in the repair procedure. The heating step is so critical that a special heating iron is necessary unless care is taken to practice the repair procedure before an actual repair of fabric on furniture is undertaken.

My U.S. Pat. No. 3,713,926 discloses the use of a graining paper over a heat-curable patching paste. The procedure calls for moving a flat hot surface over the graining paper and thus eases the constraints on the heating step considerably. A heating tool of small dimension is desirable with this procedure, but a household iron can be made to serve if care is taken.

On the other hand, without considerable care, material around the damage can itself become damaged by the heat step. My application Ser. No. 551,084, filed Feb. 20, 1975, now U.S. Pat. No. 3,975,558, discloses one remedy for this problem, namely heat-insulating paste which coats the undamaged material around a damage and thus prevents damage due to heat. The protective layer is formed into a continuous film which is easily removed after the repair is completed. This protective coating allows an amateur to make quite suitable repairs with a home iron.

BRIEF DESCRIPTION OF THE INVENTION

The present invention is based on the recognition that the heating step in such prior art repair procedures employed either a constant temperature heating implement, which is expensive, or a household iron which is heated normally to a temperature far in excess of what was necessary to produce the curing of the patching compound. The present invention, in contradistinction, employs the use of heat-transfer tool which applies a surface, characterized by a decreasing temperature, to the patching compound. The amount of heat applied to cure the patch can be regulated by the geometry of the heat-transfer tool, the damage due to the heating step is entirely avoided. The heat-transfer tool is inexpensive because it is a simple, passive member requiring no control. However, a household iron may be used as the heat source, the heat-transfer tool being heated thereby is a branding iron for applying a premeasured amount of heat to the patching compound.

DETAILED DESCRIPTION

The invention is directed at the use of a heat-transfer tool to apply a decreasing temperature gradient to a heat curable patching compound used to repair plastics and is described in terms of a known repair procedure disclosed in my U.S. Pat. No. 3,713,926 where a graining paper is used over the heat curable patching compound. It is important for the graining paper to be separate from the heating surface to avoid direct contact between the curing patching compound and the heating surface. Direct contact results in adherence of the curing compound to areas of the heating surface and the degradation of the resulting patch.

Figure 1:
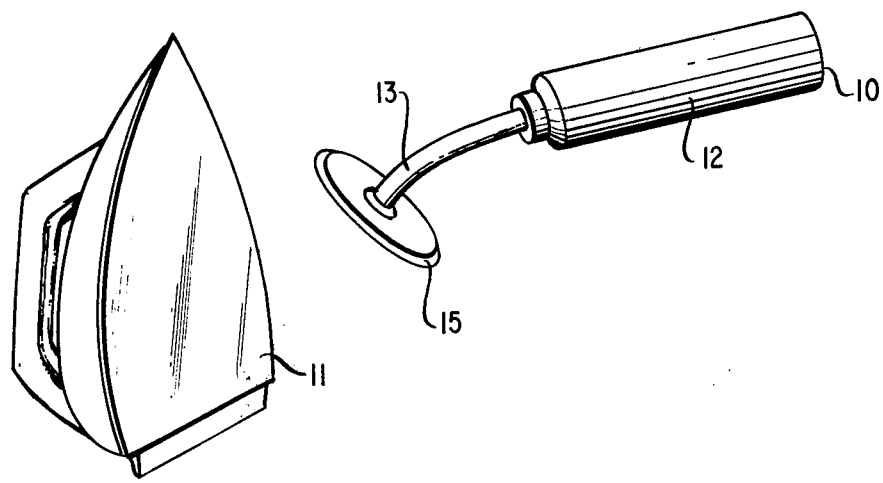
FIG. 1 is a perspective view of a heat-transfer implement or tool for applying heat in a repair procedure in accordance with an embodiment of this invention.

FIG. 1 shows a heat-transfer tool 10 and a familiar household iron 11. The heat-transfer tool is approximately five inches long with a four inch portion 12 of wood. The head portion 13 of the tool is about one inch long having about a one inch button 15 at its end. The button is less than about one quarter inch thick.

Figure 2:
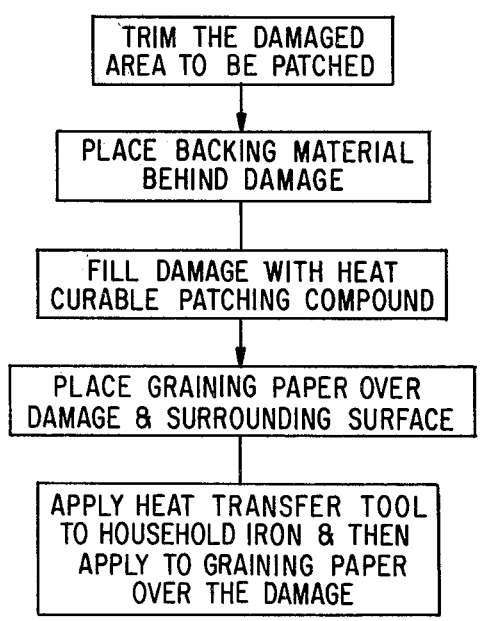
FIG. 2 is a block diagram of a method in accordance with this invention.

In order to repair a damage to an area of plastic upholstery fabric, the damage is trimmed to remove loose cloth as indicated in the top block of FIG. 2. Thereafter, a backing material, typically a close weave cheese cloth, is placed behind the damage as indicated by the next lower block in FIG. 2. As indicated in the next lower block in the figure, the damage is then filled in with a patching compound of a type which cures in the presence of heat to form a film as described fully in my above-mentioned patent. The uncured compound is then covered by a graining paper as indicated in the next to the bottom block of FIG. 2.

The iron is turned on and quickly reaches a temperature of over 350° F. The heat-transfer tool then is a applied to the iron to heat the tool to a temperature of 350° F. When heated, in just a few seconds, the tool is applied to the graining paper over the patching compound. The tool is kept in place for about a minute, the decreasing temperature of the tool ensuring curing as well as the elimination of damage to the surrounding undamaged area of the material. This last step is shown in the lowest block of FIG. 2.

The decreasing heat gradient of the heat-transfer tool is considered a significant feature of this invention. It turns out in practice that active heating elements are the single most effective causes of bad patches made with techniques employing heat applied through a graining paper—an otherwise extremely effective patching procedure. The use of a heat-transfer tool allows the cooling rate to be determined by the material chosen and the geometry and volume of the head of the tool—the button. In a preferred form, the head and button portions of a tool having the dimension described hereinbefore are made of aluminum. When heated to about 350° F. and applied to the patching compound as described, the tool is cool to the touch in one minute and the patch is complete. No movement of the tool is necessary though, of course, due to the presence of a graining paper, accidental movement may occur without damaging the patch. Further, no degradation of the surrounding undamaged material occurs.

For large area damages, the repair may be made in sections, each repair as described hereinbefore.

My aforementioned patent describes the film-forming patching compound in detail. One example is repeated here for convenience. Specifically, a polyvinyl chloride acetate in the form of a finely divided resin, 70% by weight, is mixed with a plasticizer such as diethylhexylpthalate, 30% by weight, to form the paste. The paste cures in less than a minute in most application by the application of the heated heat-transfer tool of the type shown in FIG. 1.

What is claimed is:

1. In a repair procedure for repairing damage in thermoplastic film employing heat to cure an in situ patching compound covered by graining paper, the improvement comprising adding a substantially fixed quantum of heat energy to a heat transfer tool by placing said tool against a source of heat at a temperature above that temperature necessary to cure said patching compound, said heat transfer tool having a volume and geometric shape such that it can transfer a quantum of heat sufficient to cure such patching compound but insufficient to damage said thermoplastic film, heating said tool to substantially the temperature of said source and transferring said substantially fixed quantum of heat energy from said heat transfer tool to such patching compound by applying said tool to said graining paper.

2. A repair procedure for repairing damage in thermoplastic film comprising the steps of trimming the edges of the damage, placing a backing material behind such damage, filling the damage with a heat-curable, film forming patching compound, placing a graining paper over such patching compound, adding a substantially fixed quantum of heat energy to a heat transfer tool by placing said tool against a source of heat at a temperature above that temperature necessary to cure such patching compound, said heat transfer tool having a volume and geometric shape such that it can transfer a quantum of heat sufficient to cure such patching compound but insufficient to damage said thermoplastic film, heating said tool to substantially the temperature of said source, transferring said substantially fixed quantum of heat energy from said heat transfer tool by placing said tool against the graining paper over such damage for a time to effect curing of such compound and removing said tool and such graining paper.

3. The repair procedure of claim 2, wherein said heat transfer tool includes a substantially planar surface for contact with said graining paper.

4. The repair procedure of claim 1 or 2, wherein the temperature of said heat source is at least 350° F.

* * * * *